US010630006B2

(12) United States Patent
Mancias et al.

(10) Patent No.: US 10,630,006 B2
(45) Date of Patent: Apr. 21, 2020

(54) SIM CARD READER CONNECTOR WITH RETENTION CONTACT

(71) Applicant: PalPilot International Corp., Milpitas, CA (US)

(72) Inventors: Isau Mancias, Milipitas, CA (US); Collin Lo, ShenZhen (CN)

(73) Assignee: PALPILOT INTERNATIONAL CORP., Milpitas, CA (US)

( * ) Notice: Subject to any disclaimer, the term of this patent is extended or adjusted under 35 U.S.C. 154(b) by 229 days.

(21) Appl. No.: 15/803,774

(22) Filed: Nov. 4, 2017

(65) Prior Publication Data

US 2018/0131116 A1 May 10, 2018

Related U.S. Application Data

(60) Provisional application No. 62/417,329, filed on Nov. 4, 2016.

(51) Int. Cl.
| | |
|---|---|
| *H01R 4/48* | (2006.01) |
| *H01R 13/24* | (2006.01) |
| *H01R 12/72* | (2011.01) |
| *G06K 13/08* | (2006.01) |
| *H01R 12/71* | (2011.01) |
| *G06K 7/00* | (2006.01) |

(52) U.S. Cl.
CPC ......... *H01R 4/4809* (2013.01); *G06K 7/0021* (2013.01); *G06K 13/0806* (2013.01); *H01R 12/714* (2013.01); *H01R 12/721* (2013.01); *H01R 13/245* (2013.01); *H01R 13/2457* (2013.01)

(58) Field of Classification Search
CPC .......................... H01R 4/4809; H01R 13/245
See application file for complete search history.

(56) References Cited

U.S. PATENT DOCUMENTS

| | | | | |
|---|---|---|---|---|
| 6,283,770 | B1 * | 9/2001 | Leung ................ | H01R 13/6582 439/92 |
| 6,951,470 | B1 * | 10/2005 | Huang ................ | H01R 13/245 439/159 |
| 2011/0031094 | A1 | 2/2011 | Konno et al. | |
| 2014/0162490 | A1 | 6/2014 | Hodge et al. | |
| 2014/0315437 | A1 | 10/2014 | Soo | |
| 2015/0041296 | A1 | 2/2015 | Bertsch | |
| 2016/0164211 | A1 | 6/2016 | Mikawa | |
| 2018/0131116 | A1 * | 5/2018 | Mancias ............ | G06K 13/0806 |

OTHER PUBLICATIONS

The International Search Report and Written Opinion rendered by the International Searching Authority for PCT/US2017/60069, dated Jul. 16, 2018, 7 pages.

* cited by examiner

*Primary Examiner* — James Harvey
(74) *Attorney, Agent, or Firm* — Skaar Ulbrich Macari, P.A.

(57) ABSTRACT

A card connector for SIM cards and the like includes a base or housing and a cover that removably attaches to the base. A spring contact disposed within the base that engages a card during insertion and removal operations to provide controlled insertion and removal forces. The spring contact defines a base portion defining a first longitudinal end and an opposing second longitudinal end, a first resilient member extending above the base portion, a second resilient member extending above the base portion, and a third resilient member extending above the base portion.

20 Claims, 7 Drawing Sheets

SIM CARD READER CONNECTOR WITH RETENTION CONTACT

PRIORITY

This application claims the priority benefit of U.S. Provisional Application No. 62/417,329 filed on Nov. 4, 2016, which is hereby incorporated herein by reference in its entirety.

FIELD

The present invention relates generally to card readers, and more particularly, to connectors for card readers featuring a retention contact.

BACKGROUND

There are many types of electronic cards and smart cards in use today, including Subscriber Identity Module (SIM) cards, memory cards, cable and satellite television decoder cards, identification cards and authentication cards, and others. These cards typically must be inserted into a connector or receiver component of the corresponding electronic device.

In the case of SIM cards, there is specific design criteria that must be met pertaining to aspects such as insertion and extraction forces. One such set of standards is specified by NDS Limited (now owned by Cisco) for smart cards to be used with smart card readers. The card connectors, for example, must have an "extraction force" for a standard SIM card that is in the range of 300 to 700 grams. The card connector must be able to repeatedly provide the specified extraction force without failing or damaging the SIM card.

Therefore, there is a need to provide a smart or electronic card connector that can meet the NDS requirements reliably, repeatedly and without damaging the SIM card, as well as maintaining the insertion and extraction forces specified in the NDS limits.

SUMMARY

A card connector for SIM cards and the like includes a base or housing and a cover that removably attaches to the base. A spring contact disposed within the base that engages a card during insertion and removal operates to provide controlled insertion and removal forces. The spring contact defines a base portion defining a first longitudinal end and an opposing second longitudinal end, a first resilient member extending above the base portion, a second resilient member extending above the base portion, and a third resilient member extending above the base portion.

The disclosure includes a card connector. The card connector includes a base, which includes a first rail, an opposing second rail and a bridge portion spanning between the opposing first and second rails. A plurality of contact pins are disposed in the bridge portion of the base. A switch pin and detection pin are disposed within the first rail. A spring contact is disposed within the second rail. The spring contact defines a base portion defining a first longitudinal end and an opposing second longitudinal end, a first resilient member extending above the base portion, a second resilient member extending above the base portion, and a third resilient member extending above the base portion.

The first resilient member can extend vertically upward from the base portion to form an oblique angle with respect to the base portion. The first resilient member can diverge from the base portion as the first resilient member extends towards the first longitudinal end of the base portion.

The second resilient member can extend vertically upward from the base portion to form an oblique angle with respect to the base portion. The second resilient member can diverge from the base portion as the second resilient member extends towards the first longitudinal end of the base portion. The second resilient member can be longitudinally located along the base portion between the first resilient member and the second longitudinal end.

The third resilient member can extend from the second longitudinal end of the base portion and curve upward and back over a top side of the base portion towards the first longitudinal end. Prior to reaching a terminal end of the third resilient member a peak can be defined at a highest vertical height of the third resilient member above the base portion, whereafter the third resilient member can decrease in vertical height above the base portion as the third resilient member slopes downward towards the terminal end thereof.

The third resilient member can extend vertically above the second resilient member so that the second resilient member is positioned longitudinally along the base portion such that a vertical downward movement of the third resilient member towards a top side of the base portion results in contact with the second resilient member. Further downward movement of the third resilient member towards a top side of the base portion then results in the third resilient member forcing the second resilient member downward towards the base portion.

The first resilient member can be positioned longitudinally along the base portion such that the vertical downward movement of the third resilient member does not result in contact with the third resilient member.

The spring contact can be configured to define a card insertion force in the range of 400 and 800 grams and a card extraction force in the range of 300 and 700 grams.

The base can be configured to define a push to fail value of approximately 11.25 kg.

A cover can be secured to the base.

The disclosure also includes a method of securing a card in a card connector of an electronic device. The card connector includes a base. The base includes a first rail, an opposing second rail and a bridge portion spanning between the opposing first and second rails. A spring contact can be disposed within the first rail portion of a base. The spring contact can define a first resilient member, a second resilient member and a third resilient member. The card can be inserted into the base. While performing the insertion of the card, the third resilient member of the spring contact can contact a bottom side of the card to force the third resilient member in a direction normal to the bottom of the bottom side of the card. While performing the insertion of the card, and as the third resilient member continues to move in the direction normal to the bottom of the bottom side of the card, the third resilient member can contact the second resilient member of the spring contact to force the second resilient member in the direction normal to the bottom of the bottom side of the card. While performing the insertion of the card, the first resilient member of the spring contact can contact the bottom side of the card to force the first resilient member in a direction normal to the bottom of the bottom side of the card.

The card can be inserted into a proximal end of a slot defined in the first rail of the base until the card abuts a distal end of the slot. The third resilient member can contact the bottom side of the card before the first resilient member contacts the bottom side of the card. The card connector can be a SIM card connector and the card can be a SIM card.

The disclosure further includes a spring contact component for a card connector. The card connector can include a base. The base can include a first rail, an opposing second rail and a bridge portion spanning between the opposing first and second rails. The spring contact component can be disposed within one of the first and second rails. The spring contact component can include a base portion defining a first longitudinal end and an opposing second longitudinal end, a first resilient member extending above the base portion, a second resilient member extending above the base portion, and a third resilient member extending above the base portion. The second resilient member can be longitudinally located along the base portion between the first resilient member and the second longitudinal end. The second resilient member can be longitudinally located along the base portion between a terminal end of the third resilient member and the second longitudinal end of the base portion. The third resilient member can extend vertically above the second resilient member. The second resilient member can be positioned longitudinally along the base portion such that a vertical downward movement of the third resilient member towards a top side of the base portion results in contact with the second resilient member. Further downward movement of the third resilient member towards a top side of the base portion can result in the third resilient member forcing the second resilient member downward towards the base portion.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
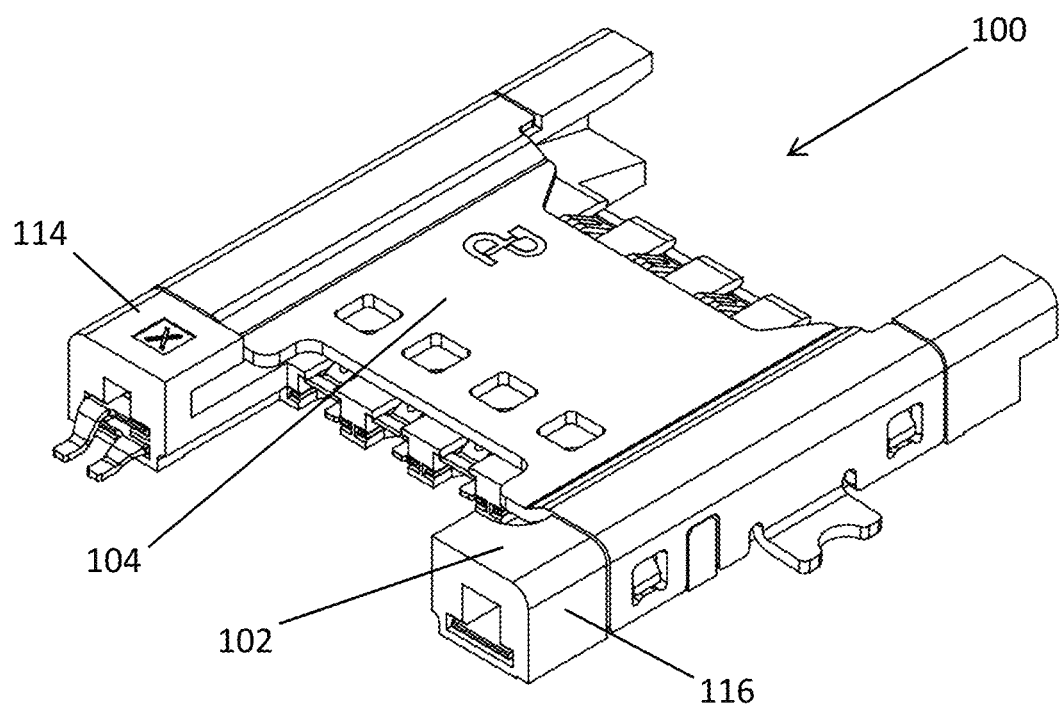
FIG. 1 is a perspective view of a SIM card connector in accordance with certain embodiments of the invention.
Figure 2:
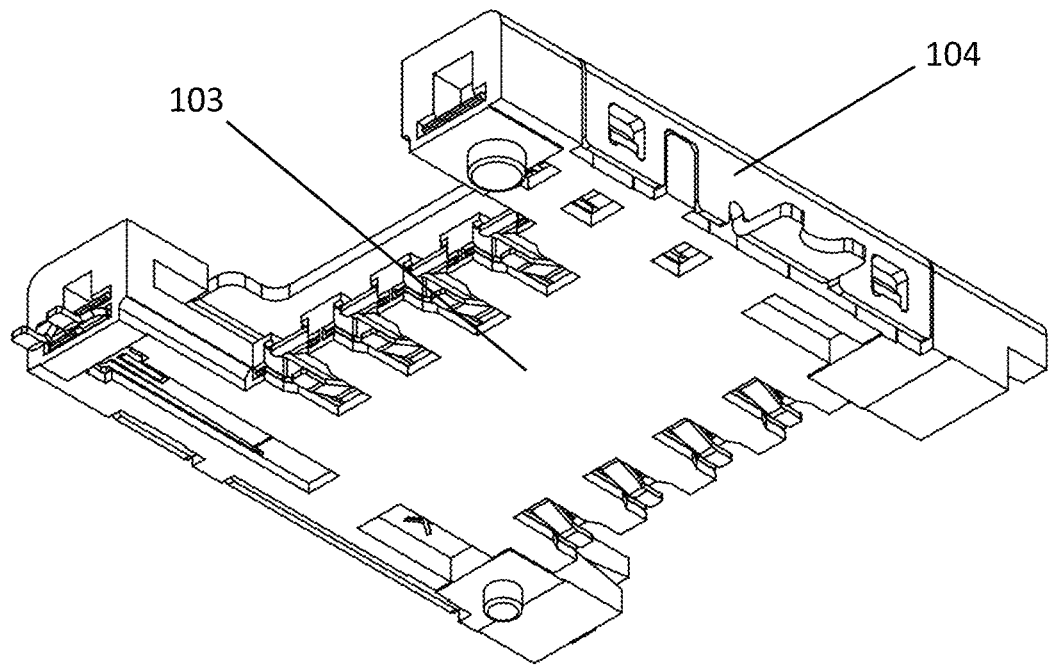
FIG. 2 is another perspective view of a SIM card connector in accordance with certain embodiments of the invention.
Figure 3:
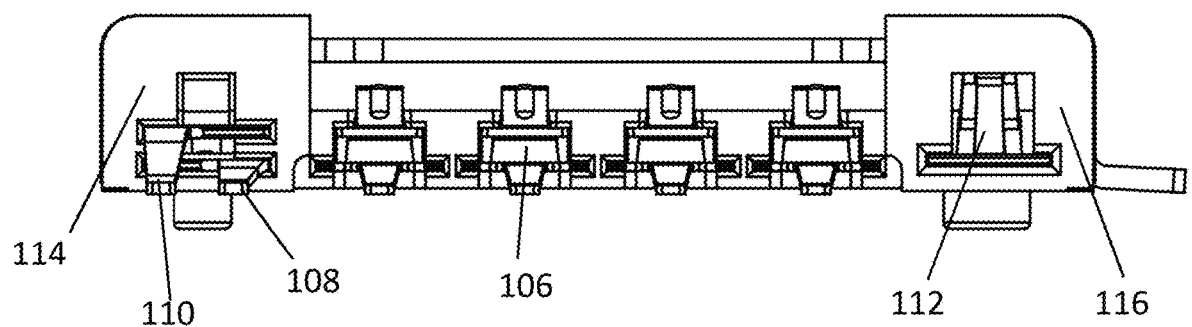
FIG. 3 is a rear view of a SIM card connector in accordance with certain embodiments of the invention.
Figure 4:
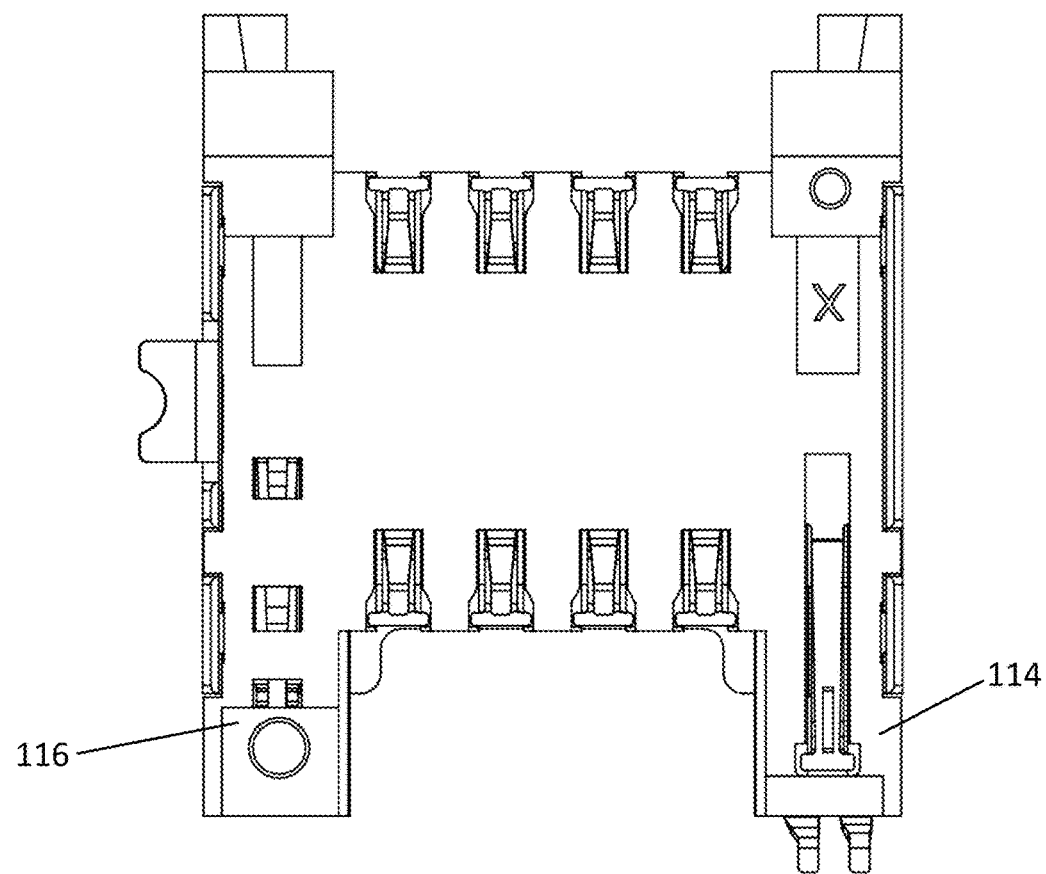
FIG. 4 is a bottom plan view of a SIM card connector in accordance with certain embodiments of the invention.
Figure 5:
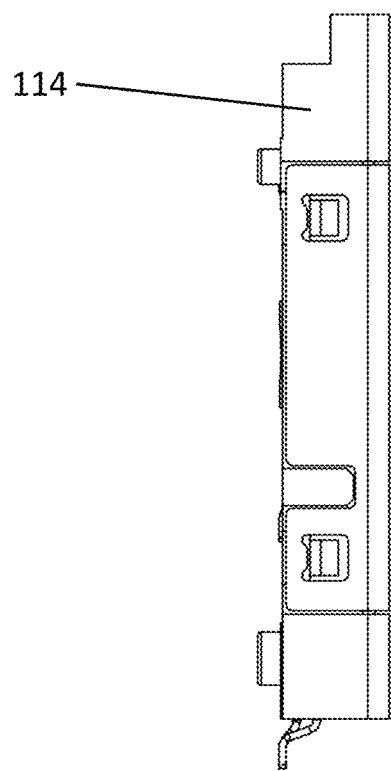
FIG. 5 is a first side view of a SIM card connector in accordance with certain embodiments of the invention.
Figure 6:
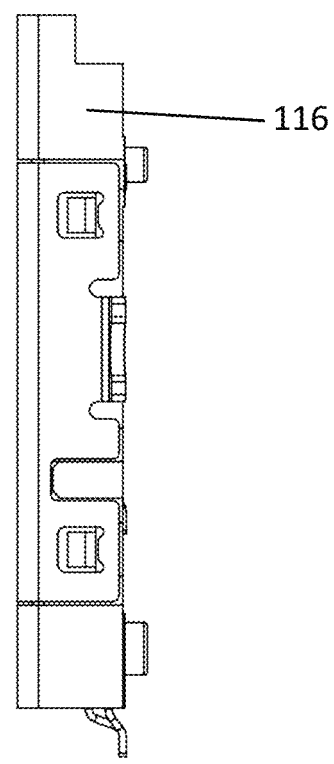
FIG. 6 is a second side view of a SIM card connector in accordance with certain embodiments of the invention.
Figure 7:
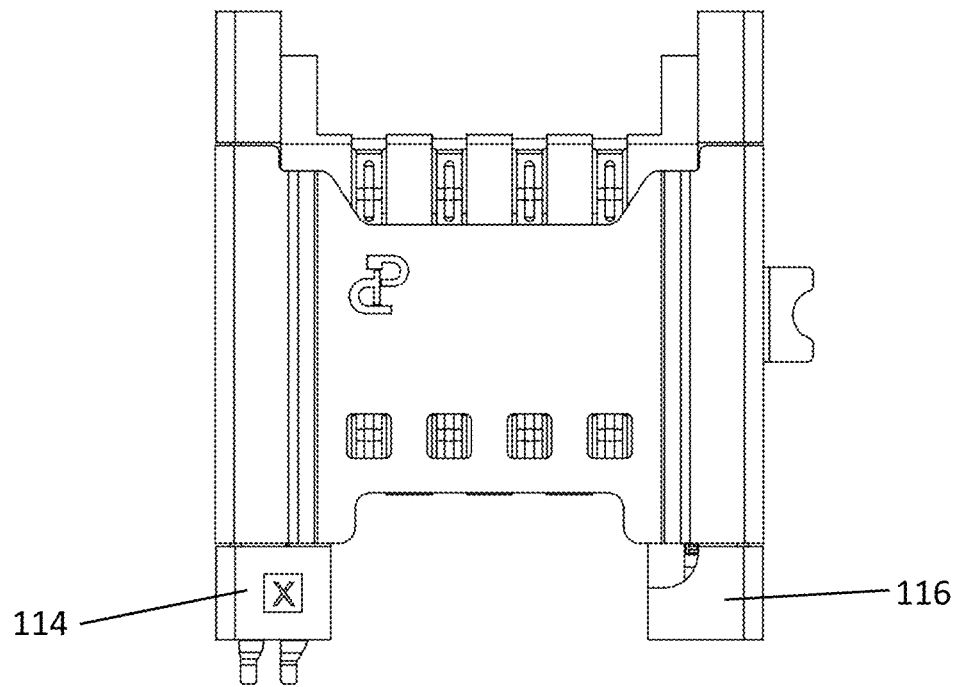
FIG. 7 is a top plan view of a SIM card connector in accordance with certain embodiments of the invention.
Figure 8:
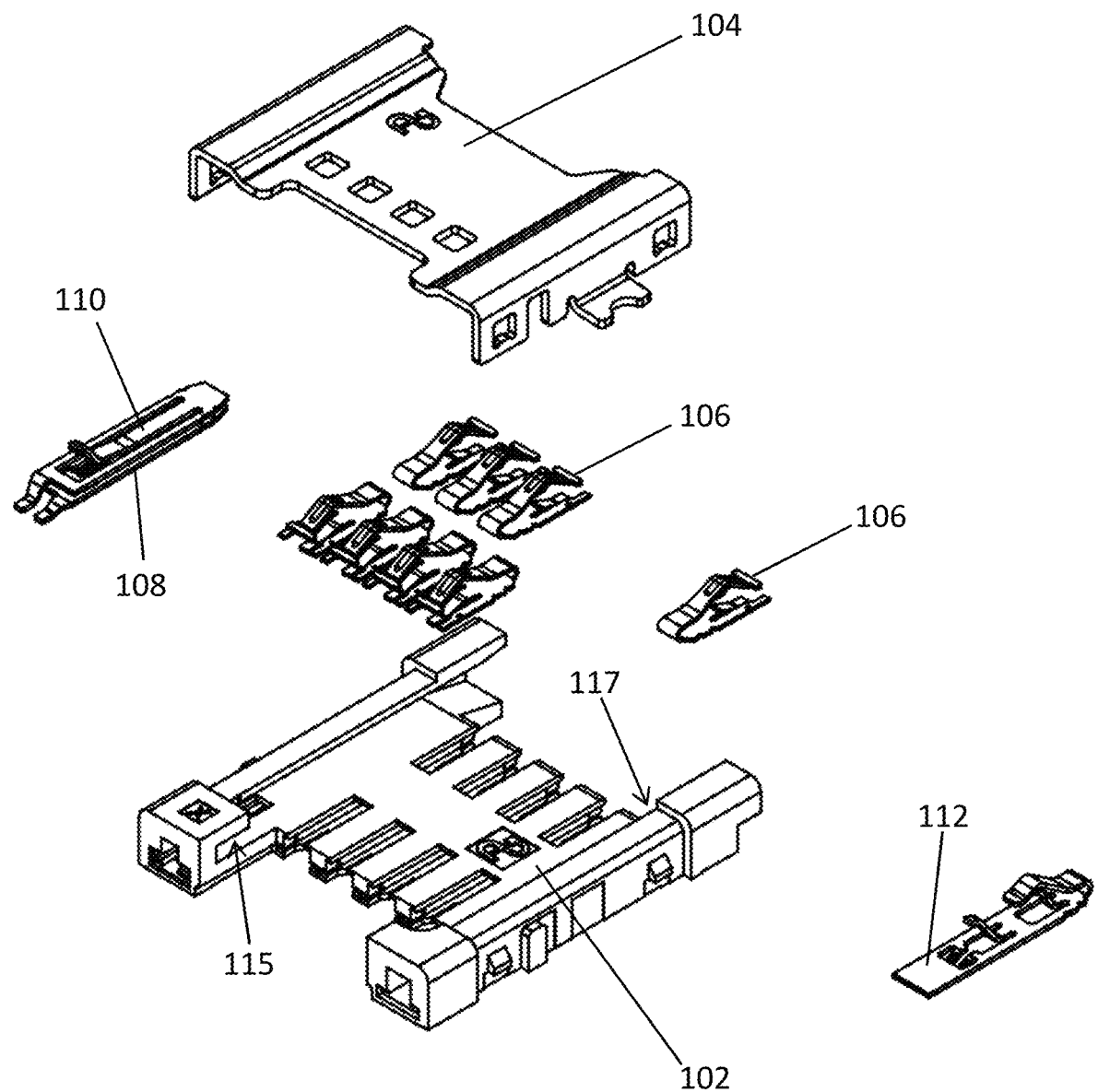
FIG. 8 is an exploded perspective view of a SIM card connector in accordance with certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The following discussion specifically refers to SIM card connectors. However, it should be understood that the card connector device, components, systems, methods, and aspects thereof, can be adapted to a wide variety of smart cards, memory cards and electronic cards. Therefore, the SIM card is one example illustration for an embodiment and application of the invention, but is not intended to limit the invention to SIM card applications.

Referring to FIGS. 1-12, a SIM card connector 100 generally comprises a housing or base 102 and a cover 104 that secures to the base 102.

A plurality of conductive elements are disposed within the base 102 as can be seen throughout the figures. The conductive elements comprise a plurality of contact pins 106, a switch pin 108, detection pin 110, and a spring contact 112.

The base 102 generally comprises opposing rails or channels 114, 116 oriented parallel to one another with a bridge portion 103 spanning between the opposing rails 114, 116. A respective guide slot 115, 117 is defined in each of the side rails 114, 116. The guide slots 115, 117 have a vertical height dimension sufficient to accommodate the vertical width of the SIM card with minimal clearance. The lateral depth dimension of the slots 115, 117 is also such that the horizontal lateral width of the SIM card is accommodated with minimal clearance. The longitudinal depth dimension of the slots 115, 117 can be widely varied depending on the desired insertion depth for the particular application. However, the longitudinal depth dimension of the slots 115, 117 is preferably identical for both rails 114, 116.

The slots 115, 117 terminate within the rails 114, 116 so that the SIM card will abut a distal end of the slot rather than being pushed through the back side of the connector. This can be seen, for example, in FIG. 11. Note that the proximal end is the insertion or front end of the card connector 100 in the figures. The distal portions of the rails 114, 116 (adjacent the back side of the card connector 100) are formed with thick enough and/or strong enough material so that an acceptable push to fail value can be achieved. For example, the card connector 100 depicted in FIGS. 1-8 has been found to achieve a push to fail value of 11.25 kg.

The contact pins 106 make the electrical contacts to the SIM card. The contact pins 106 are disposed within the bridge portion 103 and make contact with the underside of the SIM card, including the card's respective connection areas, which are usually exposed flat metal areas where the contact pins 106 can physically touch the card's metal surfaces.

The switch pin 108 and detection pin 110 are disposed in a parallel stacked arrangement within one of the opposing side rails 114 or 116 (for example, the right rail when viewed from the front of the card connector 100). Each pin 108, 110 includes a protruding electrical lead 109, 111 that is connected to the electronic device. The pins 108,110 are normally spaced apart so that no electrical circuit is formed and the electronic device can know that no card is present in the connector device 100. However, the act of inserting the SIM card pushes a raised portion 113 of the switch pin 108 downward to complete an electrical circuit between the switch pin 108 and the detect pin 110. Thus, the electronic device can know that the SIM card is present. The raised portion 113 of the switch pin is located such that the SIM card must be fully inserted before the circuit is completed. Thus, the SIM card is known to be fully inserted when the electronic device senses the presence of the SIM card.

Figure 12:
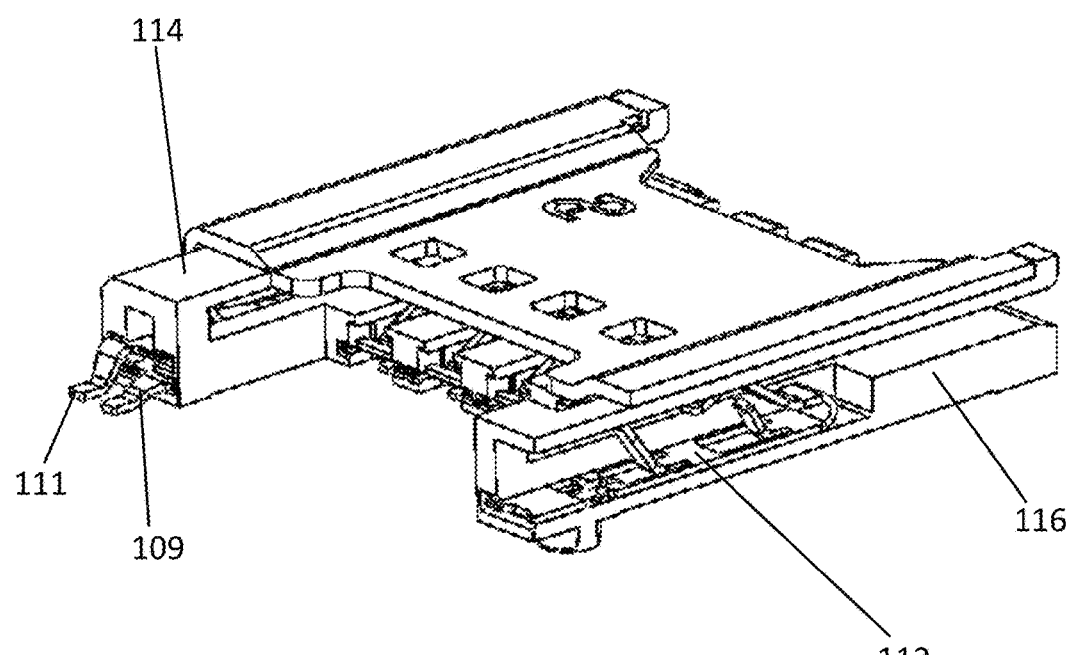
FIG. 12 is a perspective view of an assembled SIM card connector in accordance with certain embodiments of the invention with a partial cutaway section showing the spring contact disposed within the base.

The spring contact 112 is disposed within one of the opposing side rails 114 or 116 that is opposite the rail containing the pins 108, 110 (for example, the left rail when viewed from the front of the card connector 100). The cutaway portion of the base 102 in FIG. 12 shows the spring contact 112 disposed in the left rails 114 of the base 102. The spring contact 112 functions to engage the SIM card to provide a set insertion force and a set extraction force.

Figure 9:
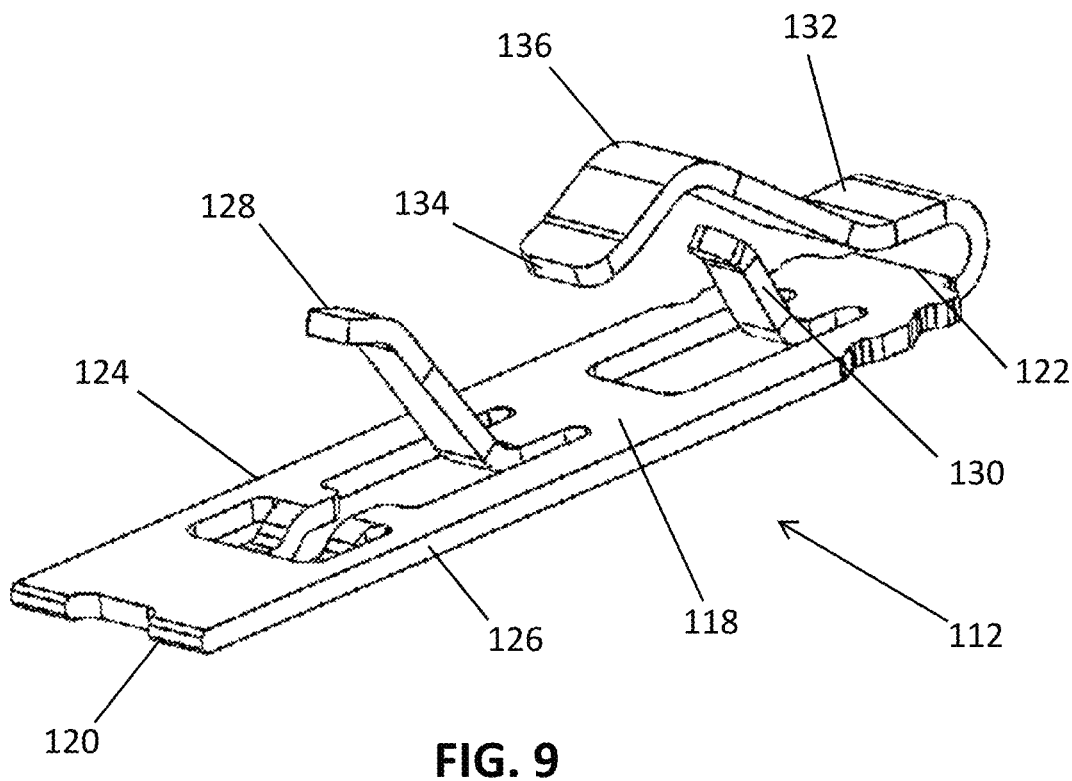
FIG. 9 is a perspective view of a spring contact for a SIM card connector in accordance with certain embodiments of the invention.
Figure 10:
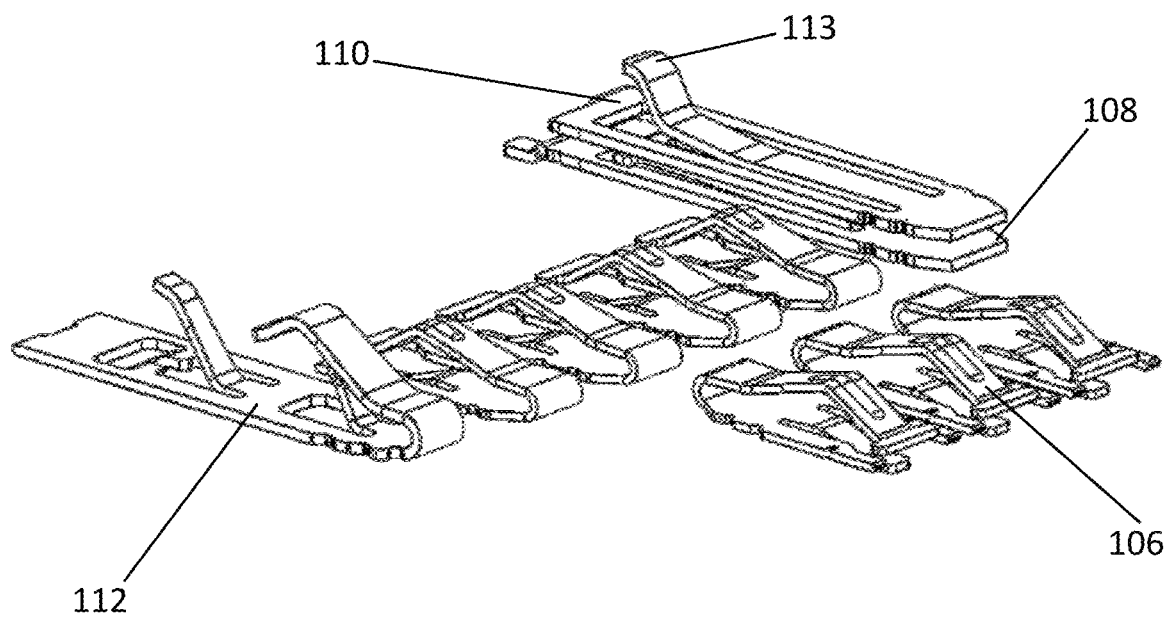
FIG. 10 is a perspective view of a spring contact, detect pins and a switch pin of a SIM card connector in accordance with certain embodiments of the invention.
Figure 11:
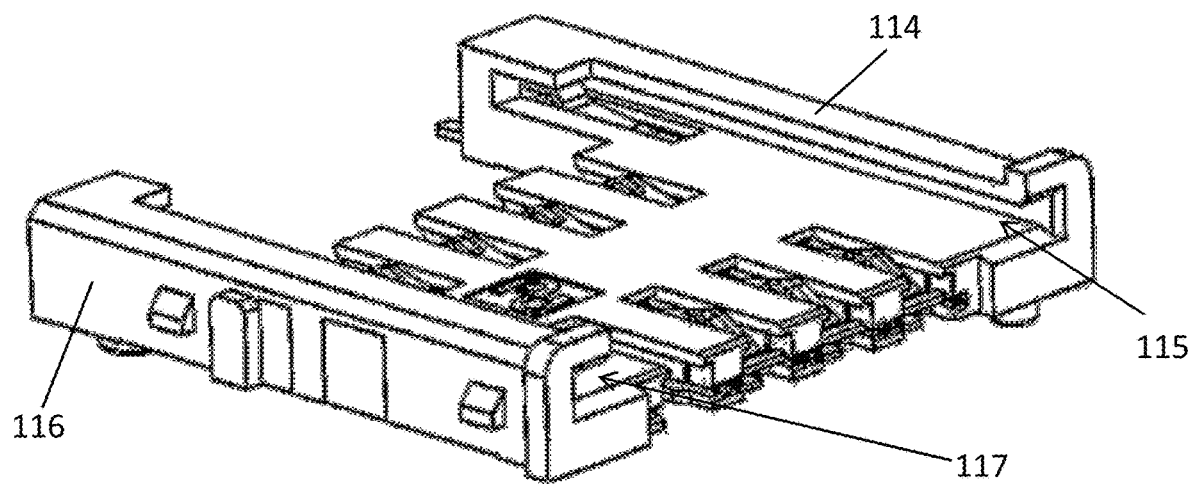
FIG. 11 is a perspective view of a base of a SIM card connector in accordance with certain embodiments of the invention.

Referring particularly to FIG. 9, the spring contact 112 is shown and will now be further discussed. The spring contact 112 comprises a planar base portion 118 that defines a first longitudinal end 120 and a second opposing longitudinal end 122. Opposed lateral sides 124, 126 span between the longitudinal ends 120, 122.

A first resilient member 128 extends vertically upward from the base portion 118 to form an oblique angle with respect to the base portion 118. The first resilient member 128 diverges from the base portion 118 as it extends towards the first longitudinal end 120 of the base 118.

A second resilient member 130 extends vertically upward from the base portion 118 to form an oblique angle with respect to the base portion 118. The second resilient member 130 diverges from the base portion 118 as it extends towards the first longitudinal end 120 of the base 118. The second resilient member 130 is longitudinally located along the base portion 118 between the first resilient member 128 and the second longitudinal end 122.

A third resilient member 132 extends from the second longitudinal end 122 and curves upward and back over the top side of the base portion 118 towards the first longitudinal end 120. Prior to its terminal end 134, the third resilient member 132 defines a peak 136 where the vertical height of the third resilient member 132 is at its highest point, whereafter the vertical height decreases as the member 132 slopes downward towards the terminal end 134 thereof. The second resilient member 130 is longitudinally located along the base portion 118 between the terminal end 134 of the third resilient member 132 and the second longitudinal end 122.

The first 128 and third 132 resilient members contact the underside of the SIM card when the card is inserted into the guide slots 115, 117 defined in the side rails 114, 116 of base 102. The SIM card insertion further causes the third resilient member 132 to move vertically downwards to contact the second resilient member 130, which forces the second resilient member 130 vertically downward too. In this manner, the insertion and extraction (removal) forces, which must be exerted on the SIM card, can be reliably controlled. Moreover, the disclosed configuration of the spring contact 112 allows the insertion and extraction forces to have minimally dissimilar force ranges, if so desired for the particular use of the card connector 100. The spring contact 112 component as disclosed herein allows the card connector 100 to satisfy NDS Limited's test criteria.

The spring contact 112 can be formed of metal or other suitable material, such as for example, phosphor bronze. The material does not permanently deform when subjected to repeated cycles of card insertion/extraction. Thus, the insertion/extraction forces can be maintained within an acceptable minimal range of deviation over a given lifetime of usage.

The base 102 can be formed of an electrically non-conductive material, such as for example, glass filled thermoplastic, UL94V-0 rated material, which can withstand the temperatures occurring within the electronic device where the connector 100 is located.

The cover 104 can be formed of a metal such as plated nickel, which has the advantage of dissipating heat conducting from the SIM card while inserted within the connector 100.

Figure 13:
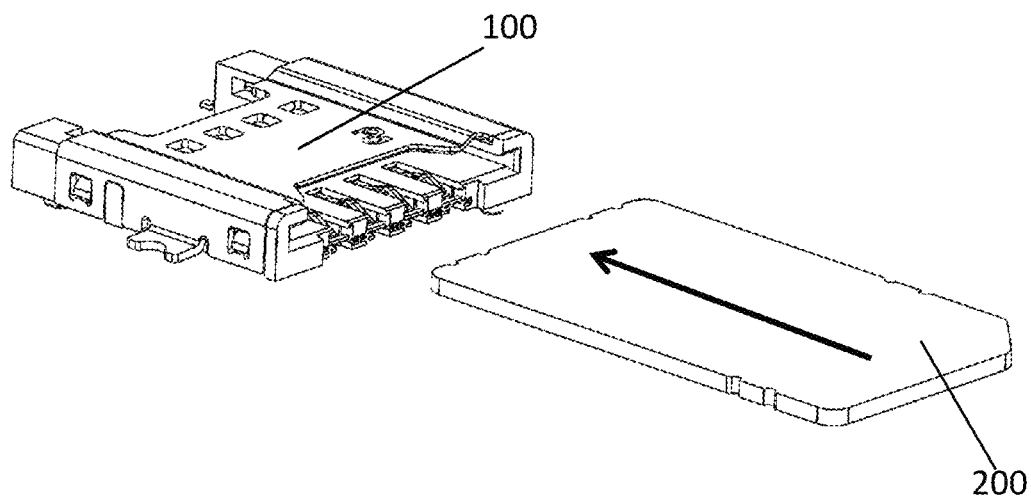
FIG. 13 is a perspective view of a SIM card being inserted into a SIM card connector in accordance with certain embodiments of the invention.
Figure 14:
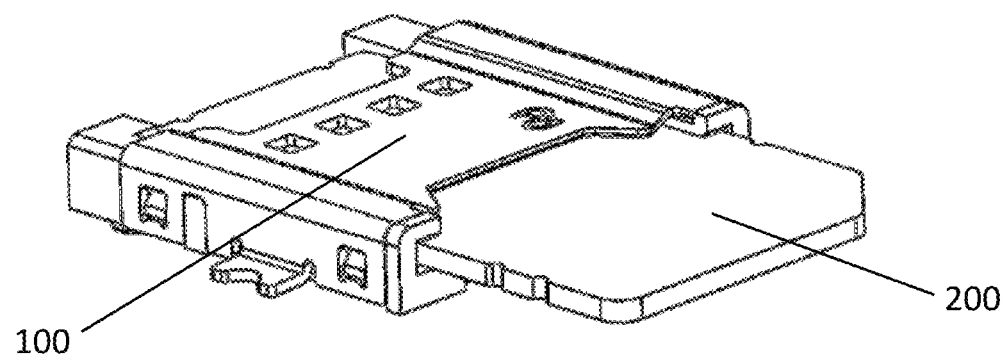
FIG. 14 is a perspective view of a SIM card fully inserted into a SIM card connector in accordance with certain embodiments of the invention.
Figure 15:
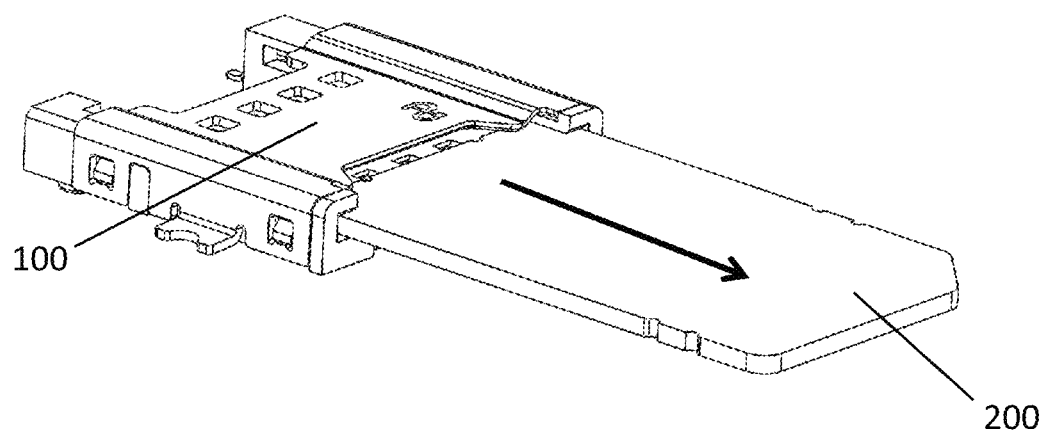
FIG. 15 is a perspective view of a SIM card being extracted from a SIM card connector in accordance with certain embodiments of the invention.

Referring to FIGS. 13-15, in use, a SIM card 200 is shown being inserted into the card connector device 100 in FIG. 13 as indicated by the arrow shown on the top surface of the card 200. The insertion forces are configured primarily by the configuration of the spring contact 112. The angle, material and length of the resilient members 128, 130 and 132 can be varied to achieve a specified insertion force range. For example, the SIM card 200 insertion force in this example, employing the spring contact 112 shown throughout the figures, is between 400 and 800 grams. However, other insertion forces can be specified in other embodiments without departing from the scope of the invention. FIG. 14 illustrates the SIM card 200 in its fully-inserted position. FIG. 15 illustrates the SIM card 200 being extracted from the connector device 100 as shown by the arrow shown on the top surface of the card 200. When employing the spring contact 112 shown throughout the figures, the extraction force is between 300 and 700 grams. However, other extraction forces can be specified in other embodiments without departing from the scope of the invention.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A card connector, comprising:
    a base, the base including a first rail, an opposing second rail and a bridge portion spanning between the opposing first and second rails;
    a plurality of contact pins disposed in the bridge portion of the base;
    a switch pin and detection pin disposed within the first rail; and
    a spring contact disposed within the second rail, wherein the spring contact defines:
        a base portion defining a first longitudinal end and an opposing second longitudinal end;
        a first resilient member extending above the base portion;
        a second resilient member extending above the base portion; and
        a third resilient member extending above the base portion.

2. The card connector of claim 1, wherein the first resilient member extends vertically upward from the base portion to form an oblique angle with respect to the base portion, and wherein the first resilient member diverges from the base portion as the first resilient member extends towards the first longitudinal end of the base portion.

3. The card connector of claim 1, wherein the second resilient member extends vertically upward from the base portion to form an oblique angle with respect to the base portion, and wherein the second resilient member diverges from the base portion as the second resilient member extends towards the first longitudinal end of the base portion.

4. The card connector of claim 3, wherein the second resilient member is longitudinally located along the base portion between the first resilient member and the second longitudinal end.

5. The card connector of claim 1, wherein the third resilient member extends from the second longitudinal end of the base portion and curves upward and back over a top side of the base portion towards the first longitudinal end.

6. The card connector of claim 5, wherein prior to reaching a terminal end of the third resilient member a peak is defined at a highest vertical height of the third resilient member above the base portion, whereafter the third resilient member decreases in vertical height above the base portion as the third resilient member slopes downward towards the terminal end thereof.

7. The card connector of claim 6, wherein the second resilient member is longitudinally located along the base portion between the terminal end of the third resilient member and the second longitudinal end of the base portion.

8. The card connector of claim 7, wherein the third resilient member extends vertically above the second resilient member, wherein the second resilient member is positioned longitudinally along the base portion such that a vertical downward movement of the third resilient member towards a top side of the base portion results in contact with the second resilient member, and wherein further downward movement of the third resilient member towards a top side of the base portion results in the third resilient member forcing the second resilient member downward towards the base portion.

9. The card connector of claim 1, wherein the second resilient member is longitudinally located along the base portion between the first resilient member and the second longitudinal end, and the second resilient member is longitudinally located along the base portion between a terminal end of the third resilient member and the second longitudinal end of the base portion.

10. The card connector of claim 9, wherein the third resilient member extends vertically above the second resilient member, wherein the second resilient member is positioned longitudinally along the base portion such that a vertical downward movement of the third resilient member towards a top side of the base portion results in contact with the second resilient member, and wherein further downward movement of the third resilient member towards a top side of the base portion results in the third resilient member forcing the second resilient member downward towards the base portion.

11. The card connector of claim 1, wherein the third resilient member extends vertically above the second resilient member, wherein the second resilient member is positioned longitudinally along the base portion such that a vertical downward movement of the third resilient member towards a top side of the base portion results in contact with the second resilient member, and wherein further downward movement of the third resilient member towards a top side of the base portion results in the third resilient member forcing the second resilient member downward towards the base portion.

12. The card connector of claim 11, wherein the first resilient member is positioned longitudinally along the base portion such that the vertical downward movement of the third resilient member does not result in contact with the third resilient member.

13. The card connector of claim 1, wherein the spring contact is configured to define a card insertion force in the range of 400 and 800 grams and a card extraction force in the range of 300 and 700 grams.

14. The card connector of claim 1, wherein the base is configured to define a push to fail value of at least 11 kg.

15. The card connector of claim 1, further comprising a cover secured to the base.

16. A method of securing a card in a card connector of an electronic device, the card connector comprising a base, the base including a first rail, an opposing second rail and a bridge portion spanning between the opposing first and second rails, the method comprising:
    disposing a spring contact within the first rail portion of a base, the spring contact defining a first resilient member, a second resilient member and a third resilient member;
    inserting the card into the base;
    while performing the insertion of the card, contacting the third resilient member of the spring contact with a bottom side of the card to force the third resilient member in a direction normal to the bottom of the bottom side of the card;
    while performing the insertion of the card and as the third resilient member continues to move in the direction normal to the bottom of the bottom side of the card, the third resilient member contacting the second resilient member of the spring contact to force the second resilient member in the direction normal to the bottom of the bottom side of the card; and while performing the insertion of the card, contacting the first resilient member of the spring contact with the bottom side of the card to force the first resilient member in a direction normal to the bottom of the bottom side of the card.

17. The method of claim 16, further comprising inserting the card into a proximal end of a slot defined in the first rail of the base until the card abuts a distal end of the slot.

18. The method of claim 16, wherein the third resilient member contacts the bottom side of the card before the first resilient member contacts the bottom side of the card.

19. The method of claim 16, wherein the card connector is a SIM card connector and the card is a SIM card.

20. A spring contact component for a card connector, the card connector including a base, the base including a first rail, an opposing second rail and a bridge portion spanning between the opposing first and second rails, the spring contact component disposed within one of the first and second rails, the spring contact component comprising:
   a base portion defining a first longitudinal end and an opposing second longitudinal end;
   a first resilient member extending above the base portion;
   a second resilient member extending above the base portion; and
   a third resilient member extending above the base portion,
   wherein the second resilient member is longitudinally located along the base portion between the first resilient member and the second longitudinal end, and the second resilient member is longitudinally located along the base portion between a terminal end of the third resilient member and the second longitudinal end of the base portion, and
   wherein the third resilient member extends vertically above the second resilient member, wherein the second resilient member is positioned longitudinally along the base portion such that a vertical downward movement of the third resilient member towards a top side of the base portion results in contact with the second resilient member, and wherein further downward movement of the third resilient member towards a top side of the base portion results in the third resilient member forcing the second resilient member downward towards the base portion.

\* \* \* \* \*